United States Patent [19]

Calhoun et al.

[11] Patent Number: 5,273,805
[45] Date of Patent: Dec. 28, 1993

[54] STRUCTURED FLEXIBLE CARRIER WEB WITH RECESS AREAS BEARING A LAYER OF SILICONE ON PREDETERMINED SURFACES

[75] Inventors: Clyde D. Calhoun, Stillwater; Carl R. Kessel, St. Paul, both of Minn.

[73] Assignee: Minnesota Mining and Manufacturing Company, St. Paul, Minn.

[21] Appl. No.: 740,323

[22] Filed: Aug. 5, 1991

[51] Int. Cl.$^5$ ................................ B32B 3/20
[52] U.S. Cl. ...................... 428/156; 428/40; 428/41; 428/42; 428/352; 428/161; 428/163; 428/167; 428/172; 428/173; 428/195; 428/202; 428/906; 428/214; 428/215; 428/220; 428/336; 428/338; 428/339; 428/447; 428/448; 428/449; 428/180

[58] Field of Search .......... 428/40, 41, 42, 352, 428/156, 161, 163, 167, 172, 173, 195, 202, 906, 214, 215, 220, 336, 338, 339, 447, 448, 449, 180

[56] References Cited

U.S. PATENT DOCUMENTS

| 3,341,348 | 9/1967 | Letendre | 428/173 |
| 3,410,712 | 11/1968 | Winzer | 428/173 |
| 3,503,782 | 3/1970 | Ayres | 117/45 |
| 3,511,178 | 5/1970 | Curtin | 101/450 |
| 3,554,835 | 1/1971 | Morgan | 156/234 |
| 4,171,397 | 10/1979 | Morrow | 428/195 |
| 4,435,461 | 3/1984 | Gray, III et al. | 428/156 |
| 4,761,320 | 8/1988 | Coburn, Jr. | 428/352 |
| 4,930,266 | 6/1991 | Calhoun et al. | 51/293 |
| 4,985,342 | 1/1991 | Muramoto et al. | 430/280 |
| 5,087,494 | 2/1992 | Calhoun et al. | 428/40 |
| 5,141,790 | 8/1992 | Calhoun et al. | 428/40 |

FOREIGN PATENT DOCUMENTS

| 0330452 | 2/1989 | European Pat. Off. |
| 3727078A1 | 8/1987 | Fed. Rep. of Germany |
| WO90/07560 | 7/1990 | PCT Int'l Appl. |
| WO91/13752 | 9/1991 | PCT Int'l Appl. |

Primary Examiner—Ellis P. Robinson
Assistant Examiner—William P. Watkins, III
Attorney, Agent, or Firm—Gary L. Griswold; Walter N. Kirn; Darla P. Neaveill

[57] ABSTRACT

A flexible carrier web has a planar surface bearing thereon a predetermined pattern consisting of at least one flat land area and at least one recess having a base and walls, and a layer of silicone on the land and/or the base of the recess while the walls of the recess are substantially free from the silicone. When that flexible carrier web is used as the backing of a pressure-sensitive adhesive layer, release values can be controlled simply by selecting the size and/or number of recesses.

15 Claims, 1 Drawing Sheet

STRUCTURED FLEXIBLE CARRIER WEB WITH RECESS AREAS BEARING A LAYER OF SILICONE ON PREDETERMINED SURFACES

BACKGROUND OF THE INVENTION

1. Field of the Invention

The invention concerns a flexible carrier web having on at least a portion thereof a silicone layer and a method by which a layer of silicone can be applied to a flexible carrier web. The invention also concerns pressure-sensitive adhesive tapes that employ such flexible carrier webs as backings.

2. Description of the Related Art

It has long been recognized that silicone layers afford excellent release to layers of pressure-sensitive adhesive tapes, however release values provided by silicone layers tend to be undesirably low for many uses, e.g., about 4–60 g/cm of width. In an attempt to control the release properties, it has been suggested that the silicone be applied only to a portion of the desired substrate.

In U.S. Pat. No. 4,171,397 (Morrow), the release properties are regulated by first coating a sheet substrate with a fluorochemical polymer consisting of a perfluoroalkylsulfonamide lower alkyl acrylate and the reaction product of perfluoroalkyl-sulfonamidoalkanol, toluene diisocyanate, and hydroxypropylmethacrylate. The fluorochemical must have surface energy properties such that the contact angle of a drop of ethanol on a smooth surface thereof is at least 30°. Silicone-forming reactants are then overcoated in a manner providing a patterned silicone layer to attain release values determined by the relative exposed amounts of the fluorochemical and silicone.

In U.S. Pat. No. 3,503,782 (Ayres), a desired release value was obtained by first applying a full coating of a silicone release agent followed by a partial coating of a different silicone, preferably in the form of a pattern.

German Offenlegungsschrift P 37 27 078 (Skurnia et al.), published Feb. 23, 1989, discloses that, while pattern release coatings have been discussed for 30 years, problems associated with processing and use have not been resolved. This reference uses a method wherein two layer screen-printed silicone release coatings are made on a substrate by priming with a commercially available primer. Specifically disclosed primers include isocyanate-linked polyvinyl acetate, and solutions of chromosterate complexes mixed with polyvinyl alcohol. The silicone is then overcoated to cover from 20% to 80% of the surface.

However, because these methods require the complete coating with one primer or release agent which is then overcoated, several processing steps are required, and there is a significant amount of waste.

PCT Appln. Publ. No. WO 90/07560, published Jul. 12, 1990 (Jung et al.), discloses release values in excess of 100 gm per centimeter of width from patterned silicone release coating. The release coating is prepared by engraving an outer roll surface of a roll-coater with a pattern corresponding to the desired silicone pattern, and then coating a substrate with such roll to obtain a definite geometric pattern. However, this method is expensive as it requires a custom-made roll-coater for each pattern desired.

Another use of patterned silicone layers is to confer repositionability onto a tacky adhesive tape. In U.S. Pat. No. 3,554,835 (Morgan), a pattern of silicone dots was applied to the face of a pressure-sensitive adhesive tape. The dots allow a sheet of the tape to be slid over a substrate until pressure is applied to force the adhesive into contact with the substrate.

Patterned silicone layers are produced on printing plates, e.g., "Toray Waterless Plate", available from Toray Industries, and the like. Such a printing plate is a flexible sheet of aluminum bearing a layer of photosensitive material covered with a layer of silicone rubber. Upon exposure to light through a half-tone screen, the photosensitive material of a positive-acting plate binds firmly to the silicone rubber in areas where the light strikes. In the unexposed regions, the silicone can be brushed off, leaving the silicone layer in the predetermined pattern provided by the light exposure. Methods of making a printing plate based on photoimageable silicone are described in U.S. Pat. No. 3,511,178 (Curtin) and in U.S. Pat. No. 4,985,342 (Muramoto et al.).

In U.S. Pat. No. 4,930,266 (Calhoun et al.), a Toray printing plate having a pattern of silicone dots was wrapped on a cylinder and rotated through a fluidized bed of abrasive granules. The granules were attracted to the silicone dots. Upon moving a binder-carrying backing in synchronism with the rotating printing plate, the granules were picked up by and became embedded into the binder in the pattern of the printing plate. By thus individually positioning abrasive granules in a predetermined pattern, abrasive sheeting can produce fine finishes at surprisingly high cutting rates.

Another use of a Toray printing plate is disclosed in EPO Pat. Appln. Publ. No. 0,330,452, published Aug. 30, 1989 (Calhoun et al.). Electrically conductive particles are attracted to silicone dots and then individually transferred to an adhesive layer to make the adhesive layer electrically conductive orthogonally to its face while the adhesive layer remains electrically insulative laterally.

A method has now been discovered whereby single-layer patterned silicone release coatings can be made using conventional coating apparatus.

SUMMARY OF THE INVENTION

The present invention provides, for the first time, the capability of creating a patterned silicone layer using ordinary coating apparatus, i.e., on apparatus designed to create continuous coatings. Thus, the present invention makes the use of patterned silicone layers more economical and should ease production of a variety of useful products.

When that flexible carrier web is used as the backing of a pressure-sensitive adhesive layer, release values can be controlled simply by selecting the size and/or number of the recesses.

The flexible carrier web can also be used to transfer particles to a tacky adhesive layer in a pattern, because dry particles tend to adhere only to the silicone layer. Hence, such particles can be transferred to said tacky adhesive layer in the pattern of the land. On the other hand, a slurry of particles tends to wet only the silicone-free regions of the recesses, and the dried slurry can be transferred to said tacky adhesive layer in the pattern of the recesses.

More specifically, the present invention provides a flexible carrier web having a planar surface bearing thereon a predetermined pattern consisting of at least one flat land area and at least one recess, said recess having a base and walls, said surface bearing thereon a layer of silicone covering at least one of (a) said land area, and (b) said base of said recess, said walls of said recess being substantially free from silicone.

One embodiment of the invention provides a flexible carrier web having a planar surface bearing thereon a predetermined pattern consisting of a multiplicity of flat land areas separated by recesses having bases and walls, said surface bearing thereon a layer of silicone covering at least one of (a) said land areas, and (b) the bases of each recess, wherein the walls of the recesses are substantially free from silicone.

In other embodiments of the invention, one interconnected land area is circumscribed by separate recesses, or by one interconnected recess. In yet another embodiment of the invention, a multiplicity of land areas are circumscribed by a single interconnected recess. Two methods of making the novel carrier web are also provided. The first method provides a flexible carrier web in which only the flat land area(s) are coated.

Specifically, the first method of making a flexible carrier web, comprises the steps of a) forming on a planar surface of a flexible backing a predetermined pattern consisting of at least one flat land area and at least recess having bases and walls, b) applying to the land area a layer of a silicone, and c) immediately solidifying the silicone by crosslinking said silicone.

In the second method, a flexible carrier web having a flat, unembossed surface bearing a layer of silicone is embossed to form the recesses while breaking the silicone coating at the edges of the recesses to leave the walls of the recesses substantially free from the silicone.

SUMMARY OF THE DRAWING

In the drawing, each FIGURE is a schematic.

DETAILED DESCRIPTION OF THE INVENTION

Figure 1:
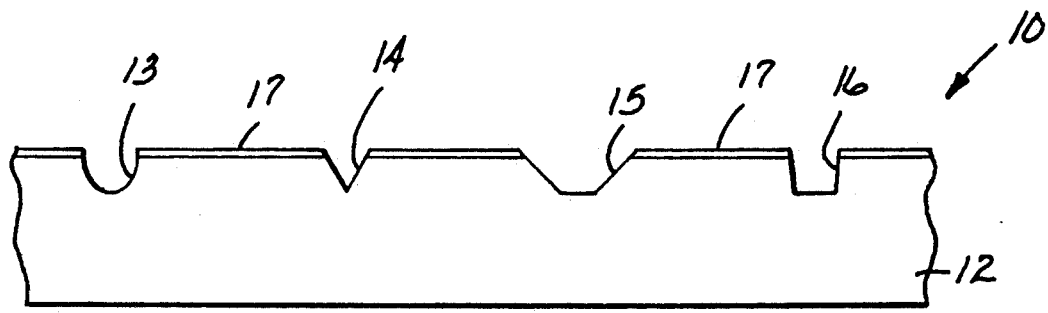
FIG. 1 is an edge view of a first flexible carrier web of the invention.

Silicones suitable for use in articles of the invention include various well-known silicones used for release coatings for pressure-sensitive adhesives. These include diorganopolysiloxanes, e.g., diphenyl-polysiloxanes, and dimethylpolysiloxanes such as those disclosed in U.S. Pat. Nos. 3,061,567, and 3,527,659, incorporated herein by reference. Ultraviolet radiation-curable silicones are useful, e.g., mercaptoalkyl substituted polysiloxanes, epoxyfunctional polysiloxanes, and acrylic functionalized polysiloxanes, as disclosed in U.S. Pat. Nos. 4,547,431, and 4,576,999, both of which are incorporated herein by reference.

Also useful are combinations of vinyl endblocked diorganopolysiloxanes in which from 3 to 30 mole percent of the nonterminal siloxane units and at least 50 mole percent of the remaining radicals on the siloxane units are methyl radicals, and organopolysiloxanes which have at least 3 Si-bonded hydrogen atoms per molecule as disclosed in U.S. Pat. No. 4,208,504, incorporated herein by reference.

Preferably, the silicone is crosslinked to ensure against accidental transfer to substrates which it may contact. Such silicones typically are crosslinked by exposure to heat, ultraviolet radiation, or electron beams. Crosslinking is especially desirable when a silicone layer is used as a release surface for a pressure-sensitive adhesive layer, as the adhesive might otherwise become contaminated by the silicone.

Virtually any material that has been used for flexible carrier webs of the prior art can be used as the flexible backing of the carrier web of the present invention. A preferred backing is kraft paper which has a coating of polyethylene that can be thermally embossed on a metal master to form recesses. Also useful are thermoplastic films which can be cast onto a master surface that is formed with protrusions to be replicated to form the recesses of the novel carrier web. Useful replicating techniques include that disclosed in coassigned U.S. Pat. No. 4,576,850 (Martens), the disclosure of which is incorporated herein by reference.

Two methods of making articles of the invention are disclosed. In the first, the carrier web is formed with a predetermined pattern of recesses, after which a thin coating of a silicone liquid is applied and then solidified by crosslinking before the silicone can flow into the recesses. To guard against such flow, the coating should be thin compared to the depth of the recesses, preferably one-tenth of the depth of the recesses or less. The use of a silicone liquid that is solventless also helps to prevent such flow.

While only the land is coated with silicone in the first method, both the land and the base of each recess can be coated in a second preferred method. A flexible carrier web having a flat, unembossed surface bearing a layer of silicone is embossed to form the recesses while breaking the silicone coating at the edges of the recesses to leave the walls of the recesses substantially free from the silicone. Unless the embossing tool is pointed, the second method leaves a layer of silicone at the base of each recess, while the uncoated walls of the recesses separate the silicone layers.

If desired, the second method can also be used to produce patterns wherein only the bases of the recesses are coated with silicone. A step is simply added wherein the silicone layer covering the land is abraded away, leaving only the silicone layer at the base of each recess. When the first method is used, the base may be minimal, e.g., an inverted cone having a small point as a base, may be used.

In either method, a single interconnected recess may circumscribe one or more land areas, or the recesses may be disconnected. The recess(es) can form a continuous grid that separates the flat surface between the recesses into a discontinuous land. Indeed, both recesses and the land can extend uninterruptedly across the flexible carrier web. The disconnected recesses are individual dimples, which can be made in various shapes such as inverted truncated cones or pyramids.

Regardless of their shape, the recesses should have a depth of at least 2 $\mu$m, preferably a uniform depth of from 5 to 100 $\mu$m, and the walls of the recesses form an angle of at least 20° with the land of the carrier web. The silicone layer preferably is no more than 2 $\mu$m in thickness, more preferably less than 1 $\mu$m.

When the novel flexible carrier web provides a release surface for a pressure-sensitive adhesive layer, it can serve either as a permanent backing or as a disposable release liner. The recesses preferably are of uniform shape and uniformly spaced in an orderly array, e.g., square or hexagonal, to afford uniform release values. Release values can be increased simply by making the recesses broader.

When only the land of the novel flexible carrier bears a silicone layer, a slurry of particles (whether aqueous or organic) does not wet the silicone but covers the uncoated walls and bases of the recesses. A dried residue of the slurry can be transferred on contact to a flat substrate such as a tacky adhesive layer, because the adhesive releases from the silicone layer, carrying with it particles in the pattern of the recesses.

When both the land and the bases of the recesses bear a silicone layer, a slurry of particles will preferentially cover only the uncoated walls of the recesses, and the dried residue of the slurry will transfer in the pattern of the walls of the recesses—e.g., a donut shape in the case in which the recesses are inverted truncated cones.

When a flexible carrier web of the invention is coated with dry particles, the particles tend to adhere only to the silicone layer, from which they can be transferred on contact to a flat substrate such as a tacky adhesive layer in the pattern of the land (or in the pattern of the land plus the bases of the recesses when the base of each recess bears the silicone). When the silicone layer covering the land has been abraded away, dry particles remain adhered only to the silicone at the base of each recess and so are transferred in the pattern of the bases.

By controlling the number, size, shape, and pattern of the recesses, the numbers of particles to be transferred to a flat substrate can be kept to a minimum, whether the particles were transferred from the land or from the bases of the recesses or from the walls of the recesses. Minimizing the number of particles minimizes the cost of the particles and, when the flat substrate is a tacky adhesive layer, that layer can form stronger bonds than if it were to receive a larger number of particles.

For example, when particles are transferred from the novel flexible carrier web to a tacky adhesive layer to make it repositionable, a relatively small number of particles in a predetermined pattern can keep the adhesive from touching a flat substrate, thus allowing it to be repositioned until pressure is applied to force the adhesive against the substrate.

When the transferred particles are electrically conductive and are transferred only from the recesses, they can make the adhesive electrically conductive through its thickness and yet be laterally spaced so that the adhesive layer is electrically insulating laterally. Alternatively, the electrically conductive particles can be transferred only from the land of the carrier web so as to leave areas of adhesive particle-free in order to increase bonding. When desired, the recesses can be so positioned that particles are transferred only to locations where the adhesive layer is to be contacted by electrodes that are to be electrically interconnected.

When the novel flexible carrier web is to be used to make a tacky adhesive tape repositionable or to make an adhesive layer electrically conductive only in the Z-axis direction, the individual recesses preferably are dimples that are small and closely spaced, e.g., from 10 to 50 μm in breadth and can be in an orderly array having a center-to-center spacing of from 50 to 250 μm.

When the recesses are long and narrow, electrically conductive particles can be transferred to an adhesive layer to form stripes of laterally contiguous particles that effort electrical conductivity along both the Z-axis and the length of each stripe. An array of such stripes that are nonintersecting can be used to make individual electrical connections between two bands of electrodes that cannot be superimposed, thus forming a product like that of coassigned U.S. Pat. No. 4,546,037 (King).

The flexible carrier web of the invention can be put to a number of uses in addition to those mentioned above. For example, particles that have been deposited either in the recesses or on the land of the carrier web can be transferred in such large quantities as to make a pressure-sensitive layer permanently nontacky wherever the particles are transferred. By thus providing both tacky and nontacky surfaces, the adhesive layer can be peeled from a substrate to which the tack surfaces form a strong bond. Such an adhesive layer can be put to a variety of uses such as to permit paper notes to be adhered temporarily to diverse substrates.

The novel flexible carrier web can take a variety of forms, a few of which are illustrated in the drawing.

DETAILED DESCRIPTION OF THE DRAWINGS

In FIG. 1, a flexible carrier web 10 has a flexible plastic backing 12 having flat surface except where it has been embossed to form a plurality of recesses including a rounded recess 13, a conical recess 14, and two truncated pyramidal recesses 15 and 16, each of which can be called a "dimple". Ordinarily, only one such recess shape would be employed in a single flexible carrier, and the recesses would be in an orderly pattern, e.g. a hexagonal or square array. The walls of the truncated pyramidal recess 15 form an angle of 45° with the land between the recesses, while the walls of the truncated pyramidal recess 16 form an angle of 80°. Covering the land is a layer 17 of silicone that preferably is crosslinked.

Figure 2:
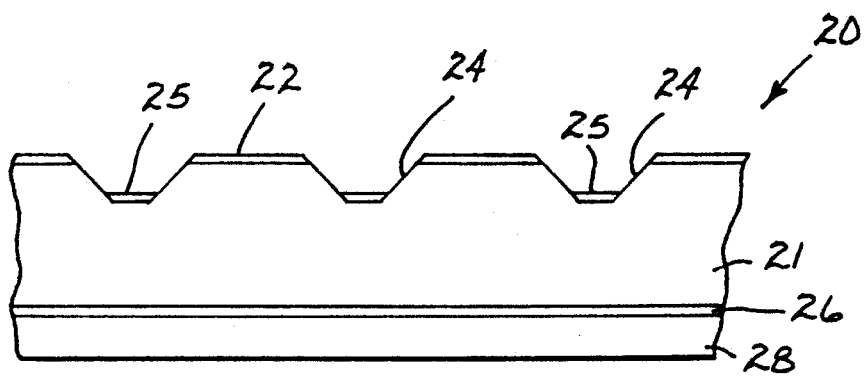
FIG. 2 is an edge view of an adhesive tape, the backing of which is a second flexible carrier web of the invention.

Shown in FIG. 2 is an adhesive tape 20 that has a flexible plastic backing 21. A silicone layer 22 has been applied to one flat surface of the plastic backing, after which the silicone-bearing surface has been embossed to form truncated pyramidal recesses 24, the walls of which form an angle of 45° with the land. There is thus produced a second flexible carrier web of the invention which includes disconnected segments 25 of the silicone layer 22 at the bases of the recesses.

Covering the other flat surface of the plastic backing 21 is a low-adhesion backsize coating 26 that in turn is covered with a layer 28 of pressure-sensitive adhesive. When the tape 20 is wound upon itself into a roll and later unwound, the adhesive layer 28 separates from whichever of the low-adhesion backsize coating 26 and silicone layer 22 affords a lower release value. After doing so and adhering the exposed face of the adhesive layer to a flat substrate, the backing 21 can be peeled off, leaving the pressure-sensitive adhesive layer 28.

Figure 3:
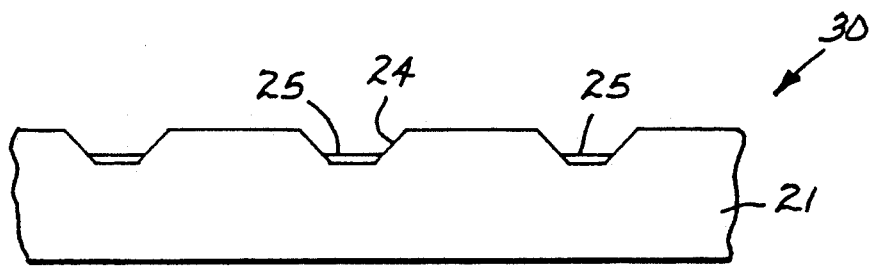
FIG. 3 is an edge view of a third flexible carrier web of the invention.

In FIG. 3, the silicone layer 22 that covered the land of the second flexible carrier web of FIG. 2 has been abraded away, thus providing a flexible carrier web 30 wherein only the base of each recess 24 bears a silicone layer 25, while the land is uncoated.

In the following examples, all parts, percentages and ratios are by weight unless specifically stated otherwise. The Examples are for illustrative purposes only, and are not meant to be limiting. The scope of the invention is solely that which is defined by the claims.

EXAMPLE 1

A 125 g/m² kraft paper coated on each side with 36 g/m² of low density polyethylene was thermally embossed to have 26 recesses or dimples per cm arranged in a square lattice array to provide 676 recesses/cm².

Each recess was an inverted truncated cone 0.15 mm in diameter at the surface and 0.1 mm in diameter at its depth of 17 μm. A 100% solids, UV-curable silicone release coating (General Electric US9300 with 3% US9310C catalyst) was applied in a layer of about 0.75 μm thickness to the embossed surface of the paper using an offset gravure coating head. The silicone coating was crosslinked by passing it under four medium pressure mercury lamps at 12 m/min to give a smear-free coating.

The utility of this silicone coated embossed carrier web in modifying release properties was tested by preparing an adhesive laminate. A solvent-based acrylic copolymer pressure-sensitive adhesive was cast directly onto the silicone coated embossed surface, dried at 70° C. for 15 minutes, and a 50 μm polyester film was laminated to the adhesive layer. This laminate was tested by peeling the polyester (with adhesive) from the release liner at a 180° angle at 230 cm/min. The release value of a laminate prepared in this manner and aged at room temperature for 3 days was 32 N/m of width. The release value of the same laminate which was aged at 70° C. for 3 days was 42 N/m of width. For comparison, the release values for the same UV cured silicone on an unembossed polyethylene coated kraft paper were 10–15 N/m of width after aging at 70° C. for 3 days.

EXAMPLE 2

An 80 μm polypropylene film containing 46% $CaCO_3$ filler was embossed to provide 26 recesses/cm in a square lattice array. Each recess was an inverted truncated cone 320 μm in diameter at the surface and 90 μm in diameter at its depth of 60 μm.

This embossed carrier web was coated with a 0.3 μm layer of Dow Corning 7676 solventless silicone release system on a five smooth-roll coater. The coating was thermally cured by passing the coated film at 7.6 m/min through a 4.3 m oven heated to 104° C. to gave a smear-free silicone layer.

About 20 cm of the silicone coated embossed film of this example was flood coated with Ag coated glass beads. The beads were agitated on the surface of the film by moving a rolling bank of beads across the film. The bead bearing film was then turned over and tapped to jar loose any unattached beads. Examination of the bead coated surface with a light microscope revealed beads substantially only on the flat surface or land between the recesses. The embossed film bearing the metalized glass beads was hot laminated to a transfer tape that consisted of 50 μm of "Primacor" 1410 (Dow) heat-activatable adhesive on a release liner. Separation of the embossed film from the tape transferred the metalized glass beads to the transfer tape. The beads in the transfer tape maintained the pattern established by the silicone coated embossed film, i.e., there was an absence of particles in a regular pattern that corresponded to the recesses on the embossed film. A section of this transfer tape was used to bond two copper strips (1 mm by 1.5 cm by 6 cm with a lap bond area of about 1.4 $cm^2$) together using a hand held iron. After cooling, the two copper strips were adhesively bonded (room temperature lap shear stress > 150 kPa when tested at a rate of 0.13 mm/min), and the resistance between the two strips was measured to be < 0.2 ohms.

EXAMPLE 3

A 75 μm thick cast polypropylene film containing 2% $TiO_2$ filler was coated with Dow Corning Syl-Off 294 solvent-based silicone release system using a direct gravure coater. After heating to remove solvent and crosslink the silicone, the final thickness of the silicone layer was approximately 0.1 μm.

The resulting carrier web was thermally embossed by passing the film between a metal embossing roll and a 70 Durometer rubber backing roll. The metal roll had 16 projections per cm arranged in a square lattice array to provide 256 projections/$cm^2$. Each projection was a 0.15 mm high truncated cone with diameters at the bottom and top of 0.4 mm and 0.1 mm, respectively. Both rolls were heated to 95° C. and the film embossed at a nip force of 5500 N/m to provide recesses in the film. Each recess was an inverted truncated cone 0.12 mm in diameter at the surface and 0.1 mm in diameter at its depth of 17 μm.

The embossed carrier web of this example was decorated with Ag coated glass beads as described in Example 2. Examination of the film with a light microscope revealed two monolayers of glass beads; one on the bases of the recesses and the other on the land areas. The presence of Ag coated beads on the bases of the recesses revealed that these surfaces were coated with silicone.

Using a motor driven silk screen frame, another piece of the embossed carrier web of this example was then coated with the following slurry: 88 parts isopropanol, 10 parts water, 2 parts "Ethocel" standard 100 grade ethyl cellulose (Dow) and 150 parts of glass beads (5000 grade from Potters Industries, Inc.). A 70 Durometer 9.5 mm urethane rubber blade with a square edge was used as the doctor. The blade was set with a 30° from vertical trailing angle.

After air drying at room temperature, a section of the coated embossed carrier web was examined with a light microscope and found to have rings or donuts of dried slurry contacting the sidewalls of the recesses. The coated embossed film was laminated to the adhesive layer of a pressure-sensitive adhesive coated vinyl film ("Scotchcal" 3690 from 3M). Delamination transferred the clusters to the adhesive on the vinyl film. The clusters of glass beads on the surface of the adhesive permitted repositioning of the film on smooth substrates, such as glass. Once positioned, the application of pressure to the back of the film was sufficient to form an aggressive bond.

What is claimed is:

1. A flexible carrier web having a planar surface bearing thereon a pattern consisting of land areas and recesses, said pattern comprising at least one flat land area and at least one recess, said recess having a base and walls, said surface having a layer of silicone covering at least one of
   a) said land area, and
   b) said base of said recess, said walls of said recess being substantially free from silicone.

2. The flexible carrier web of claim 1 wherein s silicone layer is no more than 2 μm in thickness.

3. The flexible carrier web of claim 2 wherein said layer of silicone is crosslinked.

4. The flexible carrier web of claim 1 wherein the walls of the recess form an angle of at least 20° with the land area.

5. The flexible carrier web of claim 4 wherein the depth of the recess is at least 2 μm.

6. The flexible carrier of claim 1 wherein said predetermined pattern comprises a multiplicity of land areas, surrounded by an interconnected recess, said recess being in the form of a grid.

7. The flexible carrier of claim 1 whereon said predetermined pattern comprises a multiplicity of recesses circumscribed by one interconnected land area, said land area being in the form of a grid.

8. A flexible carrier web having a planar surface bearing thereon a pattern consisting of a multiplicity of flat land areas separated by a multiplicity of recesses, said recesses having bases and walls, said surface having a layer of silicone covering at least one of
   a) said land areas, and
   b) said bases of said recesses, said walls of said recesses being substantially free from silicone.

9. The flexible carrier web of claim 8 wherein the recesses have a uniform depth of from 5 to 100 $\mu$m.

10. The flexible carrier web of claim 8 wherein the recesses are disconnected dimples selected from the group consisting of truncated pyramids, truncated cones, and rounded depressions.

11. The flexible carrier web of claim 10 wherein the dimples are from 10 to 50 $\mu$m in breadth and are in an orderly array having a center-to-center spacing of from 50 to 250 $\mu$m.

12. The flexible carrier web of claim 8 wherein said layer of silicone covers only said land areas between said recesses, both said bases and said walls of said recesses being substantially free of silicone.

13. The flexible carrier web of claim 8 wherein both said land areas and said bases of said recesses bear a layer of silicone and said walls of said recesses are substantially free from silicone.

14. The flexible carrier web of claim 13 wherein said silicone layer is no more than 2 micrometers in thickness, and is crosslinked.

15. A flexible carrier web according to claim 8 wherein said walls of said recesses form an angle of at least 20° with the land of the carrier web.

* * * * *